United States Patent [19]

James

[11] 3,883,714
[45] May 13, 1975

[54] D. C. POWER SUPPLY FOR ARC WELDING WITH SCR CONTROLLING THREE-PHASE POWER

[76] Inventor: Jasper Lewis James, Rte. 9, Greenville, Tenn. 37743

[22] Filed: July 16, 1973

[21] Appl. No.: 379,594

[52] U.S. Cl. .............................. 219/131 WR; 321/5
[51] Int. Cl. ............................................. B23k 9/10
[58] Field of Search ........ 219/131 R, 131 WR, 135; 315/284; 323/89 A, 89 B, 225 CR; 321/5, 18

[56] References Cited
UNITED STATES PATENTS

| | | | |
|---|---|---|---|
| 3,549,978 | 12/1970 | Stearns et al. | 219/131 R X |
| 3,577,156 | 5/1971 | Kotsjubinskogs et al. | 219/131 WR |
| 3,584,186 | 6/1971 | Stearns et al. | 219/131 WR |
| 3,597,580 | 8/1971 | Stearns et al. | 219/135 |
| 3,614,377 | 10/1971 | Stearns et al. | 219/131 R |
| 3,629,548 | 12/1971 | Rygiol | 219/131 R |
| 3,671,713 | 6/1972 | Hurlebaus | 219/131 R X |
| 3,688,180 | 8/1972 | Chiasson et al. | 321/21 |
| 3,718,802 | 2/1973 | Manz | 219/131 WR |
| 3,746,965 | 7/1973 | Okada et al. | 321/5 |
| 3,774,007 | 11/1973 | Chiasson et al. | 219/131 R |

Primary Examiner—J. V. Truhe
Assistant Examiner—G. R. Peterson
Attorney, Agent, or Firm—Fitch, Even, Tabin & Luedeka

[57] ABSTRACT

A D.C. arc welding power supply is supplied with three-phase power through a three-phase transformer. The secondaries of the transformer are connected to a three-phase rectifier bridge with an SCR connected in each phase. A timing pulse generator receives phase reference from the secondaries and produces timing pulses at a controlled time in each phase. A firing signal generator responds to such timing pulses by generating firing signals and applying them to the respective gate electrodes of the SCR's. A torch switch turns the timing pulses off and on to turn the welding arc off and on, even though full voltage is applied to the primaries. The timing circuit preferably comprises a relaxation oscillator circuit. Multiple torches may be supplied with controlled power simultaneously from the same transformer. A hot start circuit provides greater voltage for a predetermined interval at the beginning of a weld. A MIG spot circuit turns the arc off at the end of a predetermined time for spot welding.

11 Claims, 1 Drawing Figure

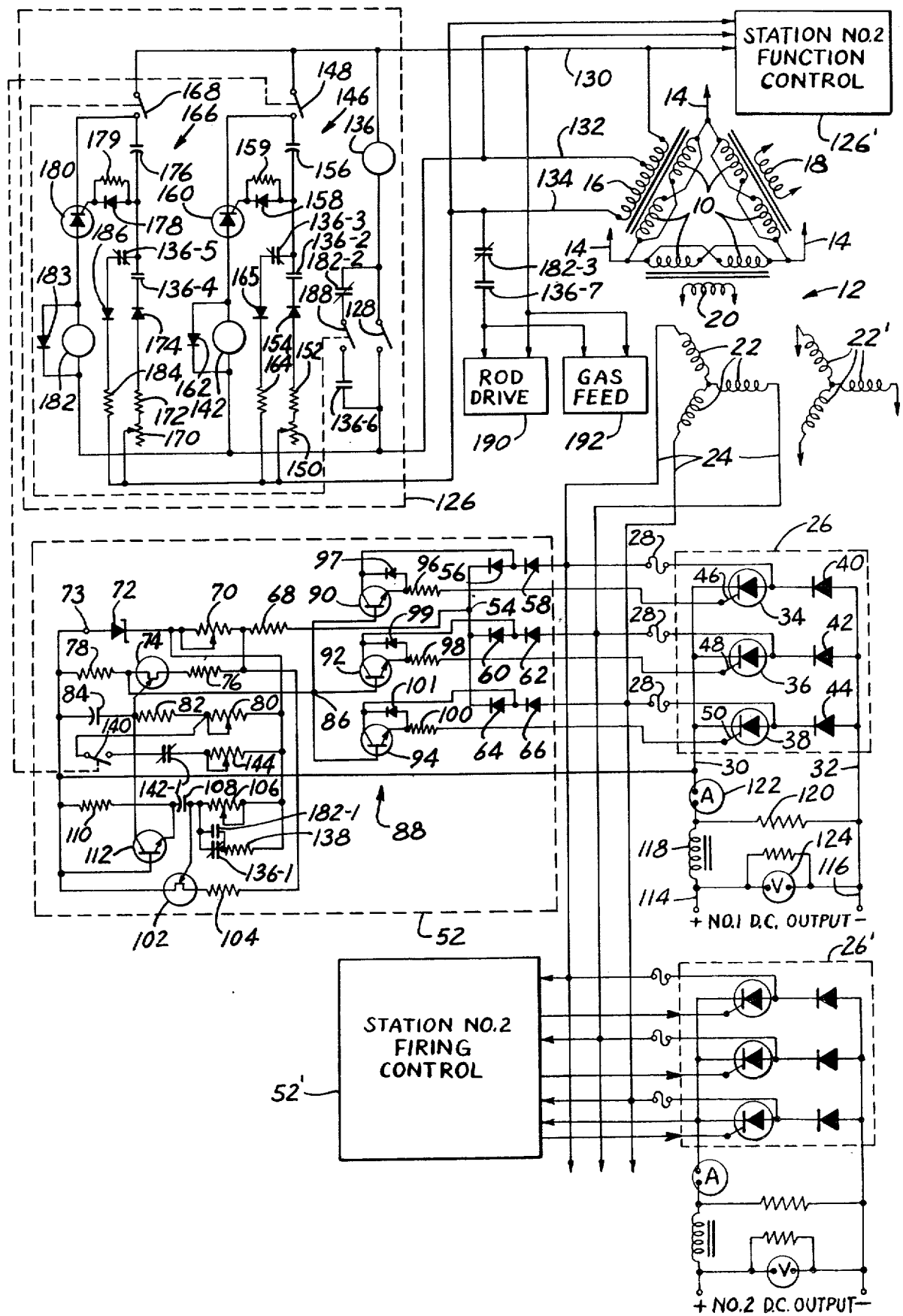

3,883,714

D. C. POWER SUPPLY FOR ARC WELDING WITH SCR CONTROLLING THREE-PHASE POWER

This invention relates to a power supply for a direct current arc welding system and more particularly to a controlled and programed power supply utilizing a three-phase rectifier bridge with silicon controlled rectifiers for control. Still more particularly, this invention relates to such system for providing time control for spot welding and hot starts and such system for simultaneous multiple torch welding.

Welding power supplies commonly utilize saturable reactors and transformers controlled in their primary circuits or with movable taps in their secondary circuits. It has been common to turn the power to the primaries of the transformer on and off in turning the welding arc on and off. The constant turning on and off of the voltage to the primaries leads to excessive heating, shortening the life of the transformers or requiring very large transformers. Further, movable contacts present opportunities for arcing which may damage the transformers or the control unit. Further, conventional power supplies often result in excessive spatter of the welding material particularly in MIG (metallic electrode inert gas) welding. This spatter is normally controlled by a variable slope control.

In accordance with the present invention, a three-phase power supply unit is provided wherein the primaries of the transformer are always energized when the welding system is ready for use, and a rectifier bridge including silicon controlled rectifiers provides a control of current that limits the spatter. Provision is made for hot starts, that is, for an arc of greater intensity at the commencement of welding to burn back the welding rod to the proper length. Provision is also made for spot welding for particular time intervals. A unijunction transistor timing circuit develops timing pulses utilized to produce firing signals to control the firing of the silicon controlled rectifiers in the bridge circuit to produce the proper welding current. The arc may be extinguished by reducing this current to zero without deenergizing the primaries of the transformer. Separate control is provided for each welding torch.

Therefore, the primary object of this invention is to provide an improved three-phase power supply for a direct current welding system and more particularly such power supply wherein the power to the power transformer is supplied continuously. Another object of the invention is to provide a novel function control system to provide for hot starts and spot welding. Still, another object is to provide such system for separately controlling the respective torches of a multiple torch system simultaneously. Other objects and advantages of the invention will become apparent from the following detailed description particularly when taken in connection with the accompanying schematic drawing of a preferred form of the controlled three-phase welding power supply of the present invention.

As illustrated in the drawing, power is supplied to the primary windings 10 of a three-phase transformer 12 over power lines 14. Power may be supplied through a circuit breaker; however, the power is applied to the primary windings at all times while the welding system is in service in order that the primaries need not be re-energized each time a welding arc is developed. Further, various auxiliary equipment is continuously powered from the same transformer by way of tertiary windings 16, 18 and 20 on the transformer 12. The controlled power for the welding operation itself is developed in the secondary windings 22 of the transformer 12. As shown, the primary windings may be delta connected while the secondary windings may be wye connected, three-phase power being developed on respective power conductors 24 connected to the respective secondary windings 22.

As the primaries 10 of the transformers 12 are energized continuously, voltage appears continuously on the conductors 24. This voltage is applied to a three-phase rectifier bridge 26 through respective fuses 28. The rectifier bridge 26 develops a D.C. output on output conductors 30 and 32, the conductor 30 being positive with respect to the conductor 32. The three-phase rectifier bridge 26 comprises a respective silicon controlled rectifier (SCR) 34, 36, 38 each having its power circuit connected from a respective conductor 24 to the positive output conductor 30. These SCR's are poled to conduct electricity toward the positive conductor 30. That is, their anodes are connected to the respective conductors 24 and their cathodes are all connected to the conductor 30. Respective diodes 40, 42 and 44 are connected between the negative output conductor 32 and the respective conductors 24 and poled to provide return paths for completing the bridge circuit.

Control of the power supplied by the three-phase bridge 26 is achieved by controlling the firing angle of the respective SCR's. It is characteristic of an SCR to become conductive whenever a proper firing signal is applied to its gate electrode, provided voltage is applied in proper polarity between its anode and cathode. Once conduction commences, the gate loses control, and conduction continues until the current is reduced to zero by external forces, as by reversal of polarity of the driving voltage. In the present rectififer bridge 26, the SCR's 34, 36 and 38 have respective gate electrodes 46, 48 and 50. Whenever the voltage on the respective conductor 24 is positive with respect to the positive output conductor 30 and an appropriate firing signal is applied to the respective gate electrode 46, 48 or 50, a respective SCR becomes conductive, raising the voltage on the output conductor 30 and remaining conductive until that part of the cycle where the voltage on the respective conductor 24 begins to drop below the voltage on the output conductor 30, whereupon the SCR becomes non-conductive and the respective gate electrode regains control.

Firing signals are developed by a firing circuit 52 which produces a firing signal at a respective proper firing angle for each of the SCR's 34, 36 and 38. The preferred firing circuit is a modification of that shown in FIG. 9.57 of SCR Manual, General Electric, Fifth Ed. 1972, p. 278. Operating voltage and phase reference is supplied from the input conductors 24 to an input terminal 54 through respective pairs of series-connected diodes 56, 58, 60, 62, 64 and 66. The conductor 24 connected to the anode of SCR 34 is connected to the anode of the diode 58, the cathode of which is connected to the anode of the diode 56, the cathode of which is connected to the terminal 54. The conductor 24 connected to the anode of the SCR 36 is connected to the anode of the diode 62, the cathode of which is connected to the anode of the diode 60, the cathode of which is connected to the terminal 54. The conductor 24 connected to the anode of the SCR 38 is connected to the anode of the diode 66, the cathode of which is connected to the anode of the diode 64, the cathode of which is connected to the terminal 54. The voltage on the terminal 54 is utilized to provide the power to the firing circuit 52, and the phase of the voltage on the terminal 54 provides a phase reference for the firing signals developed.

The voltage on the terminal 54 is applied to a voltage divider comprising a fixed resistor 68, a variable resistor 70 and a Zener diode 72 connected in series between the input terminal 54 and a reference terminal 73. The reference terminal 73 is connected to the positive output conductor 30 of the bridge 26 to provide voltage reference. The Zener diode functions to provide a constant controlled D.C. voltage whenever the voltage between the terminals 54 and 73 exceeds that voltage. The rest of the voltage between the terminals 54 and 73 is distributed between the resistors 68 and 70 depending upon the setting of the variable resistor 70.

The timing function of the firing circuit 52 is provided by a timing pulse generator comprising a unijunction transistor relaxation oscillator. This oscillator circuit comprises a unijunction transistor 74 with its upper base connected through a resistor 76 to the junction between the resistors 68 and 70 and with its lower base connected through a resistor 78 to the reference terminal 73. A series RC circuit comprising a variable resistor 80, a fixed resistor 82, and a capacitor 84 are connected across the Zener diode 72 with the capacitor 84 being connected between the reference terminal 73 and the gate electrode of the unijunction transistor 74. The unijunction transistor 74 becomes conductive whenever the voltage at its gate reaches a predetermined level. This is determined by the time constant of the RC circuit. This time constant may be controlled by the variable resistor 80.

With the full standard voltage developed across the Zener diode 72, the capacitor 84 is charged by this voltage through the resistors 80 and 82 until the voltage on the capacitor 84 reaches the trigger voltage of the unijunction transistor 74, whereupon the capacitor 84 discharges through the unijunction transistor 74 and the resistor 78, developing a timing pulse on the resistor 78 to which an output terminal 86 is connected. The phase angle of the timing pulse is timed from the application of voltage to the input terminal 54 and is delayed from that time by the time necessary to charge the capacitor 84 to the trigger voltage of the unijunction transistor 74. For reasons that will become apparent below, the relaxation oscillator circuit does not continue to oscillate but rather is turned off before conducting a second time.

The timing pulse at the output terminal 86 is applied to a firing signal generator 88 which is responsive to the timing pulse by producing firing signals at the desired firing angle to each of the gate electrodes 46, 48 and 50 of the respective SCR's. The firing signal generator may comprise respective amplifying NPN transistors 90, 92 and 94 for each phase, with the timing signal at the output terminal 86 being applied to the base of each of these transistors. The collectors of the respective transistors are supplied with voltage from the conductors 24, being connected to the respective junctions between the respective pairs of series-connected diodes 56-58, 60-62, and 64-66. The emitters of the respective transistors 90, 92, 94 are connected through respective resistors 96, 98, 100 to the respective SCR gates 46, 48 and 50. Diodes 97, 99 and 101 are connected across respective transistors 90, 92 and 94 to protect the latter against reverse bias.

Upon the occurrence of a timing pulse on the output terminal 86, the transistor 90, 92 or 94 coupled to the most positive phase is rendered conductive, supplying a firing pulse through a respective resistor 96, 98, 100 to the respective gate 46, 48, 50 of the respective SCR 34, 36, 38. The respective SCR is thereby rendered conductive, applying the voltage on the respective conductor 24 to the positive D.C. output conductor 30. This raises the voltage on the reference terminal 73 to that on the input terminal 54, making the voltage on the upper and lower bases of the transistor 74 the same, hence rendering the transistor 74 conductive and assuring discharge of the capacitor 84. This prevents any oscillation of the relaxation oscillator. The particular SCR remains conductive until the potential on its respective conductor 24 starts to fall below the voltage on the conductor 30. The respective SCR then ceases conduction and the respective gate regains control.

After a respective SCR is non-conductive and its gate is in control, the voltage on the respective power conductor 24 may again rise above the voltage on the positive D.C. output conductor 30 and a relatively positive voltage is applied through the respective diodes 56, 58, 60, 62, 64, 66 to the input terminal 54, developing the standard voltage across the Zener diode 72. Because of the interaction between the SCR's and the firing circuit 52, phase reference is supplied to the firing circuit from the input conductors 24. The three phases of the wye connected secondary windings 22 are spaced 120° apart and the voltages on the respective conductors 24 go positive at respective 120° intervals. It is only the most positive of the three phases at any one time that is applied through the diodes to the input terminal 54, for the diodes are poled to decouple the conductors that are less positive. At any one time only one of the SCR's can be conductive. Thus, as the voltage on a non-conducting SCR rises above the voltage on the positive conductor 30, and hence above the voltage on the reference terminal 73, relative potential is provided on the input terminal 54 producing the standard voltage across the Zener diode 72 and starting the period of the relaxation oscillator. This provides phase reference for the firing circuit 52 relative to the phases of the voltages applied by the conductors 24 to the respective SCR's.

After the period determined by the time constant of the RC circuit, the timing pulses produced on the output terminal 86 trigger the firing signal generator 88 at 120° intervals. These timing pulses produce firing signals at the gates of the respective SCR's. When triggered, the SCR with the most positive anode conducts, and the voltage on the positive output conductor becomes that of the most positive conductor 24. This drives the voltage on the reference terminal 73 to that on the input terminal 54 and stops the relaxation oscillator until the succeeding phase produces a voltage on the input terminal 54 that is higher than that on the reference terminal 73.

In the event that the RC time constant of the relaxation oscillator were to exceed a delay of more than 120°, the timing pulse would occur early in the cycle of the next phase, producing an increase rather than a decrease in current as phase is delayed. To prevent this, a second unijunction transistor relaxation oscillator is provided. This second relaxation oscillator includes a unijunction transistor 102 with its upper base connected through a resistor 104 to the junction between resistors 68 and 70 and with its lower base connected to reference terminal 73. The RC circuit comprises a variable resistor 106 connected between the gate of the transistor 102 and the junction between resistors 68 and 70 with a capacitor 108 connected on one side to the gate and the other side through a resistor 110 to the reference terminal 73. The time constant of this oscillator is adjusted to produce a secondary timing pulse at just less than 120° so that the unijunction transistor 102 always fires within 120° if the unijunction transistor 74 does not. The firing of the unijunction transistor 102 causes the capacitor 108 to discharge through the transistor 102 and the resistor 110. The voltage thereupon developed on the resistor 110 is applied between the base and emitter of an NPN transistor 112, the collector of which is connected to the gate electrode of the unijunction transistor 74. Thus, when the pulse is developed on the resistor 110, the transistor 112 becomes conductive, discharging the capacitor 84 and preparing it for the initiation of another cycle. Because in this mode the capacitor 84 discharges through the transistor 112 rather than through the transistor 74 and resistor 78, no primary timing pulses are produced at the output terminal 86 and all SCR's remain non-conducting.

On the other hand, should the unijunction transistor 74 fire first, terminals 54 and 73 are driven to the same potential by the conduction of the respective SCR, thus placing both bases of the transistor 102 at the same potential causing the capacitor 108 to discharge preparatory to the initiation of another cycle.

With the circuit as thus far described, controlled D.C. power is provided between the output conductors 30 and 32. The magnitude of the voltage depends upon the firing angle of the firing signals applied to the SCR's as determined by the period of the relaxation oscillator. This period is adjusted by adjustment of the variable resistor 80. This voltage is conveniently applied to the welding electrode through a conductor 114 and from the workpiece through a conductor 116, the conductor 116 being connected directly to the D.C. output conductor 32 and the conductor 114 being connected to the positive output conductor 30 through a choke 118 which serves to smooth out the welding current. A resistor 120 is connected between conductors 30 and 32 to assure that some substantial current is conducted by a respective SCR, assuring latching in of the bridge SCR's at low level loads. For monitoring and control, an ammeter 122 may be connected in series with the welding current and a voltmeter 124 may be connected across the load.

For controlling the various functions of the welding system, a weld function control circuit 126 is provided which comprises a number of relays and switches. The welding arc is turned on and off by a torch switch 128 which may be mounted as a trigger on the welding torch. It may be spring loaded to open whenever the trigger is released. Power for the weld function control circuit is derived from the tertiary winding 16 on the transformer. A low voltage is developed between conductors 130 and 132 with a higher voltage developed between conductors 130 and 134. The torch switch 128 is connected between the conductors 130 and 132 in series with a relay 136. Normally closed relay contacts 136-1 of relay 136 are connected in series with a resistor 138 in parallel with the resistor 106 to effect the turning of the torch on and off. With the contacts 136-1 closed, the resistor 138 in parallel with the resistor 106 provides such a short time constant for the respective RC circuit that the transistor 102 conducts at such high frequency that the transistor 74 never conducts, thus precluding any timing signal at the output terminal 86 and leaving the respective SCR's always non-conductive. Upon the closing of the torch switch 128, the relay 136 operates, thus opening the normally closed relay contacts 136-1 and placing the respective relaxation oscillator in its condition for preventing firing pulses after 120°.

As has been mentioned, it is desirable when a welding arc is first initiated that it be initiated at relatively high voltage to burn back the welding rod to the appropriate length, with the system thereafter supplying the normal welding voltage. This procedure is often called a hot start. To provide the additional voltage for a hot start, means is provided in accordance with the present invention to advance the timing signal by decreasing the period of the relaxation oscillator associated with the transistor 74. A hot start switch 140 is disposed in series with normally closed relay contacts 142-1 of a relay 142 and also in series with a variable resistor 144. The switch 140, relay contacts 142-1 and resistor 144 in series are connected in parallel with the resistor 80 so that when the hot start switch 140 is closed the period of the relaxation oscillator is decreased.

As it is desirable that this additional voltage be produced only for a limited period, a hot start timing circuit 146 is provided in the weld function control circuit 126. The hot start timing circuit 146 is introduced into the system by closing a hot start timing switch 148 ganged with the hot start switch 140. With the hot start timing switch 148 closed, an RC circuit is connected between the conductors 130 and 134. A variable resistor 150 and a fixed resistor 152 are connected in series through a diode 154 and normally open relay contacts 136-2 of the relay 136 to a capacitor 156. With the hot start switch 140 and hot start timing switch 148 closed, depression of the trigger switch 128 operates the relay 136 closing the relay contacts 136-2 and thereby causing the capacitor 156 to charge. The diode 154 is poled so that the side of the capacitor away from the hot start switch is charged positively. The voltage developed on this side of the capacitor is applied through a diode 158 connected in parallel with a resistor 159 to the gate of an SCR 160. The cathode of the SCR 160 is connected to the other side of the capacitor 156. The anode of the SCR 160 is connected in series through the coil of the relay 142 to the low voltage on the conductor 132. When the voltage on the capacitor 156 reaches the gating voltage of the SCR 160, the SCR 160 conducts, causing the relay 142 to operate, thereby opening relay contacts 142-1 and returning the relaxation oscillator to its normal period. A diode 162 is connected across the coil of the relay 142 to inhibit chatter of the relay as the SCR 160 goes off and on.

To establish a reference for the hot start timing circuit, a resistor 164 in series with a diode 165 and normally closed contacts 136-3 of the relay 136 is connected between the capacitor 156 and the conductor 134. Thus, when the torch switch 128 is open and relay switch 136 de-energized, the contacts 136-3 are closed and current flows through the resistor 164 until the capacitor 156 is fully charged. In this instance, the diode 165 is poled oppositely to the diode 154 so that the side of the capacitor coupled to the gate of the SCR 160 through the resistor becomes negatively charged. Then when the torch switch 128 is closed, the capacitor 156 is charged to its fullest extent negatively and the charging of that capacitor through the resistors 150 and 152 must first overcome the negative charge before being charged positively to the gating potential of the SCR 160.

For MIG spot welding, it is desirable that the welding arc be provided for a specific limited period of time. To this end, the weld function control circuit 126 includes a MIG spot timing circuit 166 comparable to the hot start timing circuit 146. The MIG spot timing circuit 166 is energized by a MIG spot timing switch 168 which connects the MIG spot timing circuit to the conductor 130 as the hot start timing switch 148 connected the hot start timing circuit 146. With the MIG spot timing switch 168 closed, an RC circuit is connected between the conductors 130 and 134. A variable resistor 170 and a fixed resistor 172 are connected in series through a diode 174 and normally open relay contacts 136-4 of the relay 136 to a capacitor 176. With the MIG spot timing switch 168 closed, depression of the trigger switch 128 operates the relay 136 closing the relay contacts 136-4 and thereby causing the capacitor 176 to be charged. The diode 174 is poled so that the side of the capacitor away from the MIG spot switch 168 is charged positively. The voltage developed on this side of the capacitor is applied through a diode 178 connected in parallel with a resistor 179 to the gate of an SCR 180. The cathode of the SCR 180 is connected to the other side of the capacitor 176. The anode of the SCR 180 is connected in series through the coil of a relay 182 to the low voltage on the conductor 132. When the voltage on the capacitor 176 reaches the gating voltage of the SCR 180, the SCR 180 conducts, causing the relay 182 to operate, thereby closing normally open relay contacts 182-1 in parallel with the now open relay contacts 136-1, stopping the timing pulses just as upon the closing of contacts 136-1. A diode 183 is connected across the coil of the relay 182 to inhibit chatter of the relay as the SCR 180 goes off and on.

To establish a reference for the MIG spot timing circuit, a resistor 184 in series with a diode 186 and normally closed contacts 136-5 of the relay 136 is connected between the capacitor 176 and the conductor 134. Thus, when the torch switch 128 is open and relay switch 136 de-energized, the contacts 136-5 are closed and current flows through the resistor 184 until the capacitor 176 is fully charged. In this instance, the diode 186 is poled oppositely to the diode 174 so that the side of the capacitor coupled to the gate of the SCR 180 becomes negatively charged. Then when the torch switch 128 is closed, the capacitor 176 is charged to its fullest extent negatively, and the charging of that capacitor through the resistors 170 and 172 must first overcome the negative charge before being charged positively to the gating potential of the SCR 180.

As described thus far, the trigger switch 128 must be held down for at least the period of the MIG spot weld. An alternate mode of operation may be employed where the trigger switch 128 is closed only momentarily. For this mode a MIG spot hold switch 188 is connected in series with normally open contacts 136-6 of the relay 136 and normally closed contacts 182-2 of the relay 182 across the trigger switch 128. As shown, the MIG spot hold switch 188 may be ganged with the MIG spot timing switch 168. With switch 188 closed, momentary closing of the trigger switch 128 operates the relay 136 closing the normally open contacts 136-6, providing current for holding the relay 136 in its operated condition when the switch 128 is opened. Only after the relay 182 is operated by the MIG spot timing circuit, thereby opening normally closed contacts 182-2, is the relay 136 released. If it is desired to operate only in this mode, the circuit of relay contacts 182-1 may be left out.

As has been stated above, the auxiliary equipment is continuously powered from the tertiary windings 16, 18 and 20. For example, fan motors, as for cooling the transformer 12, may be connected to the winding 18; welding rod drives 190 and gas feed controls 192 may be coupled to the winding 16; and lighting, torch or workpiece positioning or drive motors and other auxiliary apparatus may be coupled to the winding 20. A convenient control of the welding rod drive 190 and gas feed control 192 may be effected by placing normally open relay contacts 136-7 of relay 136 in series with the power line to these units so that the welding rod is advanced and inert gas is supplied whenever the welding arc is turned on and the welding rod is stopped and the gas turned off whenever the welding arc is turned off. When the MIG spot timing circuit is used in the mode where the torch switch 128 is kept closed, normally closed relay contacts 182-3 of relay 182 in series with relay contacts 136-7 turn off the welding rod drive and gas feed when the welding arc goes off upon operation of the relay 182.

The control circuits of the present invention are particularly useful in multiple torch systems. Second and additional welding units may be powered from the same transformer 12 by connecting an additioning rectifier bridge 26', and an additioning firing circuit 52' including a timing pulse generator and a firing signal generator to the secondary winding 22 and connecting an additional weld function control circuit 126' including a torch switch to the tertiary winding 16 for each additional torch. Where it is necessary to isolate the torches from one another, as where they are to be operated with opposite polarities, separate secondary windings 22' on the transformer 12 may be utilized for stations of the opposite polarity.

While particular preferred embodiments of the invention have been described as illustrative of the present invention, various modifications may be made therein within the scope of the invention. For example, the control system of the present invention is particularly adaptable for automatic welding with automatic programing apparatus.

A silicon controlled rectifier is the form of thyristor preferred for use in the present invention.

What is claimed is:

1. A D.C. arc welding power supply utilizing three-phase power comprising
   a three-phase transformer having primary windings for receiving three-phase power and secondary windings for delivering power in three phases to three respective power conductors,
   a three-phase rectifier bridge including three unidirectionally-conductive thyristors each having a power circuit and a gate electrode, with the power circuit serially connected to a respective one of said power conductors and conductive of current unidirectionally upon receipt of a firing signal at the respective gate electrode, and direct current output conductors for receiving said unidirectional current and applying said current to a welding torch, a timing pulse generator having a reference terminal, an input terminal, and an output terminal, said input terminal being coupled to all of said three power conductors to supply phase reference signals and power to said timing pulse generator, said reference terminal being coupled to one of said output conductors, said timing pulse generator being responsive to said phase reference signals for producing timing pulses on said output terminal following respective phase reference signals, said timing pulse generator including variable control means for controlling the phases of said timing pulses relative to the respective phases of the voltages on said power conductors, a firing signal generator including a separate amplifying means for each phase, each such amplifying means having an input coupled to said output terminal and being responsive to said timing pulses by generating temporally corresponding firing signals and including means for applying such firing signals to a respective one of said gate electrodes, whereby the current through the respective thyristors is controlled by said control means, and torch switch means having an off condition and an on condition, said torch switch means being coupled to said timing pulse generator for normally inhibiting said firing signals when in said off condition even though full voltage is applied to said primary windings, and when actuated to said on condition permitting the generation of said firing signals.

2. A power supply according to claim 1 for hot starts wherein said torch switch means includes means responsive to actuation of said torch switch means to its on condition for operating said control means to advance the phase of said timing pulses for a predetermined period.

3. A power supply according to claim 1 for spot welding wherein said torch switch means includes means for automatically returning said torch switch means to its off condition at a predetermined time after it is actuated to its on condition.

4. A D.C. arc welding power supply utilizing three-phase power comprising a three-phase transformer having primary windings for receiving three-phase power and secondary windings for delivering power in three phases to three respective power conductors, a three-phase rectifier bridge including three unidirectionally-conductive thyristors each having a power circuit and a gate electrode, with the power circuit serially connected to a respective one of said power conductors and conductive of current unidirectionally upon receipt of a firing signal at the respective gate electrode, and direct current output conductors for receiving said unidirectional current and applying said current to a welding torch, a timing pulse generator having a reference terminal, an input terminal, and an output terminal, said input terminal being coupled to all of said three power conductors through respective similarly poled diodes to supply phase reference signals and power to said timing pulse generator, said reference terminal being coupled to one of said output conductors, said timing pulse generator including a Zener diode connected to said reference terminal and coupled through first resistance means to said input terminal, capacitance means and variable resistance means serially connected across said Zener diode whereby upon application of voltage to said input terminal voltage builds up upon said capacitance means at a rate dependent upon the resistance of said variable resistance means, and pulse generating means coupled to said capacitance means for producing timing pulses on said output terminal upon the voltage on said capacitance means reaching a predetermined level, a firing signal generator including a separate amplifying means for each phase, each such amplifying means having an input coupled to said output terminal and being responsive to said timing pulses by generating temporally corresponding firing signals and including means for applying such firing signals to a respective one of said gate electrodes, whereby the current through the respective thyristors depends upon the resistance of said variable resistance means, and torch switch means having an off condition and an on condition, said torch switch means being coupled to said timing pulse generator for normally inhibiting said firing signals when in said off condition even though full voltage is applied to said primary windings, and when actuated to said on condition permitting the generation of said firing signals.

5. A power supply according to claim 4 wherein said torch switch means comprises means coupled to said capacitance means for normally limiting the voltage on said capacitance means to less than said predetermined voltage in said off condition even though full voltage is applied to said primary windings, and wherein actuation of said torch switch means to said on condition permits said voltage on said capacitance means to rise to generate said timing pulses.

6. A power supply according to claim 5 wherein said timing pulse generator includes secondary timing pulse generating means for normally producing secondary timing pulses just prior to 120° of each timing cycle, and means responsive to said secondary pulses for discharging said capacitance means, and said torch switch means comprises means for reducing the period of said secondary pulses to discharge said capacitance means before the voltage thereon reaches said predetermined level.

7. A power supply according to claim 4 for hot starts wherein said torch switch means includes means responsive to actuation of said torch switch means to its on condition for reducing the resistance of said variable resistance means for a predetermined period.

8. A power supply according to claim 7 for spot welding wherein said torch switch means includes means for returning said torch switch means to its off condition at a predetermined time after it is actuated to its on condition.

9. A D.C. arc welding power supply comprising a transformer having a primary winding for receiving power and a secondary winding for delivering power to a power conductor, a rectifier bridge including a unidirectionally conductive thyristor having a power circuit and a gate electrode, with the power circuit serially connected to the power conductor and conductive of current unidirectionally upon receipt of a firing signal at the gate electrode, and direct current output conductors for receiving said unidirectional current and applying said current to a welding torch, a timing pulse generator having a reference terminal, an input terminal, and an output terminal, said input terminal being coupled to said power conductor to supply phase reference signals and power to said timing pulse generator, said reference terminal being coupled to one of said output conductors, said timing pulse generator including a Zener diode connected to said reference terminal and coupled through first resistance means to said input terminal, capacitance means and variable resistance means serially connected across said Zener diode whereby upon application of voltage to said input terminal voltage builds up upon said capacitance means at a rate dependent upon the resistance of said variable resistance means, and pulse generating means coupled to said capacitance means for producing timing pulses on said output terminal upon the voltage on said capacitance means reaching a predetermined level, a firing signal generator coupled to said output terminal and responsive to said timing pulses by generating temporally corresponding firing signals and including means for applying them to the gate electrode, whereby the current through the thyristor depends upon the resistance of said variable resistance means, and torch switch means having an off condition and an on condition, said torch switch means including means coupled to said capacitance means for normally limiting the voltage on said capacitance means to less than said predetermined voltage when in said off condition even though full voltage is applied to said primary winding, and when actuated to said on condition permitting said voltage on said capacitance means to rise to generate said timing pulses.

10. A power supply according to claim 9 for hot starts wherein said torch switch means includes means acting upon actuation of said torch switch means to its on condition to reduce the resistance of said variable resistance means for a predetermined period.

11. A power supply according to claim 10 for spot welding wherein said torch switch means includes means for returning said torch switch means to its off condition at a predetermined time after it is actuated to its on condition.

* * * * *